United States Patent Office 3,203,852
Patented Aug. 31, 1965

3,203,852
NEMATOCIDAL AGENTS
Horst Werres, Berlin-Charlottenburg, and Ernst Albrecht Pieroh, Berlin-Hermsdorf, Germany, assignors to Schering, A.G., Berlin, Germany
No Drawing. Filed Nov. 21, 1961, Ser. No. 154,020
Claims priority, application Germany, Nov. 30, 1960, Sch 28,860
24 Claims. (Cl. 167—22)

This invention relates to novel nematocidal agents, to nematocidal compositions containing the novel agents as active ingredients, and to a method of killing nematodes by means of the novel nematocidal agents.

We have found that certain mixed anhydrides of monobasic and dibasic carboxylic acids with dithiocarbamate acid derivatives carrying an organic radical attached to the nitrogen atom having valuable nematocidal properties.

The nematocidal agents of our invention are compounds of the formula

R—NH—CS—S—CO—R′ wherein R is a radical selected from the group consisting of lower alkyl, monohalogenphenyl and radicals of the formula

—CH$_2$—CH$_2$—NH—CS—S—CO—R′ and R′ is a radical selected from the group consisting of lower alkyl, phenyl radicals, and radicals of the formula —(CH$_2$)$_{2n}$—CO—S—CS—NH—R wherein $n$ is an integer between 1 and 4.

The compounds are prepared in a manner known per se by reacting the corresponding chlorides of the carboxylic acids with dithiocarbamate salts. The following example illustrates the preferred method for preparing the mixed anhydrides of the invention.

EXAMPLE 1

19.4 g. (0.1 mole) ammonium N-isopropyl-dithiocarbamate are suspended in 150 ml. ethyl ether and 11.95 g. (0.05 mole) sebacoyl dichloride are added drop by drop over a period of 25 minutes with agitation while the reaction mixture is being cooled with ice to temperature of 5 to 7° C. Stirring is continued for 15 minutes after the sebacoyl dichloride has been added. The solid precipitate formed is filtered off with suction, dispersed in water and again filtered. It is finally dissolved in chloroform and reprecipitated by means of petroleum ether.

The mixed anhydride of sebacic acid and N-isopropyl-dithiocarbamic acid having the formula

C$_3$H$_7$—NH—CS—SCO—(CH$_2$)$_8$

—CO—S—CS—NH—C$_3$H$_7$ is obtained in a yield of 14.5 grams. It melts and decomposes at 90–91° C.

When the corresponding acyl chlorides and dithiocarbamates or ethylene-bis-dithiocarbamates are substituted for the afore-mentioned starting materials in equimolecular amounts there are obtained the following compounds in an analogous manner:

(1) The mixed anhydride of adipic acid and N-propyldithiocarbamic acid

C$_3$H$_7$—NH—CS—S—CO—(CH$_2$)$_8$

—CO—S—CS—NH—C$_3$H$_7$

Melting point between 77–79° C.

(2) The mixed anhydride of suberic acid and N-p-bromophenyldithiocarbamic acid

Br—C$_6$H$_4$—NH—CS—S—CO—(CH$_2$)$_6$

—CO—S—CS—NH—C$_6$H$_4$Br

Melting point between 105–106° C. (decomposes).

(3) The mixed anhydride of sebacic acid and N-propyldithiocarbamic acid

C$_3$H$_7$—NH—CS—S—CO—(CH$_2$)$_8$

—CO—S—CS—NH—C$_3$H$_7$

Melting point between 78–79° C.

(4) The mixed anhydride of sebacic acid and N-p-bromophenyl-dithiocarbamic acid

BrC$_6$H$_4$—NH—CS—S—CO—(CH$_2$)$_8$

—CO—S—CS—NH—C$_3$H$_7$

Melting point 106–109° C. (decomposes).

(5) The mixed anhydride of acetic acid and N-p-bromophenyl-dithiocarbamic acid

BrC$_6$H$_4$—NH—CS—S—CO—CH$_3$

Melting point between 88–90° C. (decomposes).

(6) The mixed anhydride of benzoic acid and N-p-chlorophenyl-dithiocarbamic acid ClC$_6$H$_4$—NH—CS—S—CO—C$_6$H$_5$ Melting point between 79–80° C.

(7) The mixed anhydride of p-nitro-benzoic acid and ethylene-bis-dithiocarbamic acid

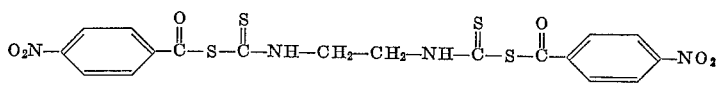

Melting point between 108–108.5° C. (decomposes).

(8) The mixed anhydride of phenylacetic acid and ethylene-bis-dithiocarbamic acid

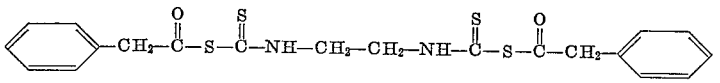

Melting point between 103–104° C. (decomposes).

(9) The mixed anhydride of suberic acid and N-p-chlorophenyldithiocarbamic acid

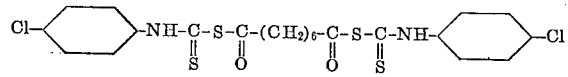

Solid compound, soluble in CHCl$_3$.

*Analysis.*—Calculated: C, 48.5%; H, 4.0%; N, 5.1%. Found: C, 48.9%; H, 4.4%; N, 5.2%.

The nematocidal agents of the invention may be employed singly, or in mixtures with each other, with other nematocidal agents, and with other pesticides. Nematocidal compositions containing the novel compounds are prepared in a manner well known to those skilled in the art by mixing the active ingredient with adjuvants, carriers, fillers, and the like, which themselves may be without significant nematocidal activity. Both solid and liquid compositions may be prepared as is well known. Suitable solid carriers include limestone, bentonite, diatomaceous earth, fuller's earth, silica, pyrophillite, talcum, gypsum and like materials in finely comminuted form.

Such preparations may be prepared for instance by grinding together the active compound, the solid carrier and an emulsifier, for example 20% active substance
79% of an aluminum silicate carrier substance
1% of an surface active agent on basis of salts of sulfurized amides of higher fatty acids Preparations of this type may be applied directly by strewing into the nematode-infested soil or by dispersing in water and spraying.

The active substance may also be dissolved in any suitable solvent and after adding an emulsifier the solution emulsified in water.

There are many modifications of these preparations possible. The portion of the active compound may vary between about 1 to 99 percent as it is desired for special purposes and there may be added further compounds.

The nematocidal agents of the invention are compatible with emulsifiers, wetting agents, binders, propellent gases, perfumes, and stabilizers conventionally employed in this art for preparing liquid concentrates or spray mixes in aqueous or other media. The liquid compositions may be propelled by mechanical pumps or by the pressure of compressed gases to form coarse droplets or aerosols.

Nematocidal effects typical of those capable of being achieved with the nematocidal agents of our invention are set forth in Example 2, but it will be understood that all compounds of the invention have similar effects on the nematodes specifically mentioned in the following example, and on others.

EXAMPLE 2

Nematode larvae are freshly collected from plant parts and are then dispersed in 2 ml. of an aqueous suspension or aqueous emulsion of a solution of the active agent in acetone. After 15 hours' standing at 20° C., the live and dead larvae are counted in each specimen. The nematodes employed in these tests are

*Ditylenchus dipsaci* (Kühn Filipjev) (code letter D)
*Aphelenchoides ritzemabosi* [(Schwartz) Steiner] (code letter A)
*Meloidogyne incognita* [(Kofoid & White) Chitwood] (code letter M)

The results of the count are expressed in the following table in percentage of dead larvae among all larvae counted in a specimen. Six nematocidal agents of the invention are tested at four different concentrations against larvae of the above three nematodes.

Table

| Active agent | Code letter | Concentration of agent in percent | | | |
|---|---|---|---|---|---|
| | | 0.05 | 0.01 | 0.005 | 0.001 |
| Anhydride of acetic and N-p-bromophenyl-dithiocarbamic acids. | D | 100 | 100 | 100 | 100 |
| | A | 100 | 100 | 100 | 100 |
| | M | 100 | 100 | 100 | 100 |
| Anhydride of suberic acid an N-p-bromophenyl-dithiocarbamic acid. | D | 100 | 100 | 100 | 50 |
| | A | 100 | 100 | 100 | 98 |
| | M | 100 | 100 | 100 | 100 |
| Anhydride of benzoic acid and N-p-chlorophenyl-dithiocarbamic acid. | D | 100 | 100 | 100 | 50 |
| | A | 100 | 100 | 100 | 100 |
| | M | 100 | 100 | 100 | 100 |
| Anhydride of sebacic acid and of N-p-bromophenyl-dithiocarbamic acid. | D | 100 | 100 | 98 | 0 |
| | A | 100 | 100 | 100 | 100 |
| | M | 100 | 100 | 100 | 30 |
| Anhydride of adipic acid and N-propyl-dithiocarbamic acid. | D | 98 | 50 | 0 | 0 |
| | A | 90 | 70 | 0 | 0 |
| | M | 100 | 100 | 90 | 0 |
| Anhydride of sebacic acid and of N-propyl-dithiocarbamic acid. | D | 70 | 50 | 30 | 0 |
| | A | 80 | 30 | 0 | 0 |
| | M | 100 | 70 | 70 | 0 |
| | | 0.1 | .05 | 0.01 | 0.005 |
| Anhydride of p-nitro-benzoic acid and ethylene-bis dithio-carbamic acid. | D | 100 | 100 | 80 | 50 |
| | A | 100 | 100 | 100 | 100 |
| | M | 100 | 100 | 100 | 100 |
| Anhydride of phenyl-acetic acid and ethylene-bis-dithiocarbamic acid. | D | 100 | 100 | 95 | 80 |
| | A | 100 | 100 | 100 | 100 |
| | M | 100 | 100 | 100 | 100 |

Obviously many modifications and variations of the present invention are possible in the light of the above teachings. It is therefore to be understood that within the scope of the apepnded claims, the invention may also be practiced otherwise than as specifically described.

We claim:

1. A nematocidal composition containing a carrier free of significant nematocidal activity, and further containing as the active ingredient thereof in a nematocidally effective amount, a compound of the formula

R—NH—CS—S—CO—R' wherein R is selected from the group consisting of lower alkyl, monohalogen-phenyl, nitrophenyl, and

—CH₂—CH₂—NH—CS—S—CO—R' and R' is selected from the group consisting of lower alkyl, phenyl, nitrophenyl, and

—(CH₂)₂ₙ—CO—S—CS—NH—R wherein *n* is an integer between 1 and 4.

2. A composition as set forth in claim 1, wherein said compound is the mixed anhydride of adipic acid and N-propyl dithiocarbamic acid having the formula

C₃H₇—NH—CS—S—CO—(CH₂)₄
                                 —CO—S—CS—NH—C₃H₇

3. A composition as set forth in claim 1, wherein said compound is the mixed anhydride of suberic acid and N-p bromophenyl-dithiocarbamic acid having the formula Br—C₆H₄—NH—CS—S—CO—(CH₂)₆
                                   —CO—S—CS—NH—C₆H₄Br 4. A composition as set forth in claim 1, wherein said compound is the mixed anhydride of sebacic acid and of N-propyl-dithiocarbamic acid having the formula

C₃H₇—NH—CS—S—CO—(CH₂)₈
                                   —CO—S—CS—NH—C₃H₇

5. A composition as set forth in claim 1, wherein said compound is the mixed anhydride of sebacic acid and of N-isopropyl-dithiocarbamic acid having the formula

C₃H₇—NH—CS—S—CO—(CH₂)₈
                                   —CO—S—CS—NH—C₃H₇

6. A composition as set forth in claim 1, wherein said compound is the mixed anhydride of sebacic acid and of N-p-bromophenyl-dithiocarbamic acid having the formula BrC₆H₄—NH—CS—S—CO—(CH₂)₈
                                   —CO—S—CS—NH—C₆H₄Br 7. A composition as set forth in claim 1, wherein said compound is the mixed anhydride of acetic acid and N-p-bromophenyl-dithiocarbamic acid having the formula BrC₆H₄—NH—CS—S—CO—CH₃

8. A composition as set forth in claim 1, wherein said compound is the mixed anhydride of benzoic acid and N-p-chlorophenyl-dithiocarbamic acid having the formula ClC₆H₄—NH—CS—S—CO—C₆H₅

9. A composition as set forth in claim 1, wherein said compound is the mixed anhydride of ethylene-bis-dithiocarbamic acid and p-nitro benzoic acid having the formula

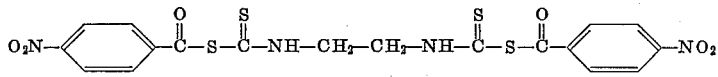

10. A composition as set forth in claim 1, wherein said compound is the mixed anhydride of phenyl acetic acid and ethylene-bis-dithiocarbamic acid having the formula

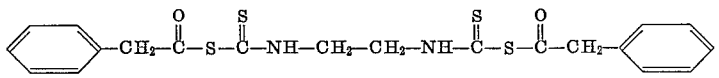

11. A method of killing nematodes which comprises exposing said nematodes to a nematocidal amount of a compound of the formula

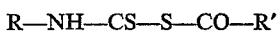

wherein R is selected from the group consisting of lower alkyl, monohalogen-phenyl, and

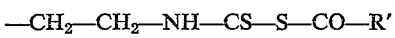

and R' is selected from the group consisting of lower alkyl, phenyl, and

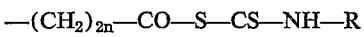

wherein $n$ is an integer between 1 and 4.

12. A method of killing nematodes which comprises applying to nematode infested soil a nematocidal amount of a compound of the formula

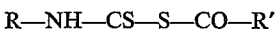

wherein R is selected from the group consisting of lower alkyl, monohalogen-phenyl and

and R' is a radical selected from the group consisting of lower alkyl, phenyl, and radicals of the formula —(CH$_2$)$_{2n}$—CO—S—CS—NH—R wherein $n$ is an integer between 1 and 4.

13. A method as set forth in claim 12, wherein said compound is the mixed anhydride of adipic acid and N-propyl-dithiocarbamic acid having the formula

C$_3$H$_7$—NH—CS—S—CO—(CH$_2$)$_4$
—CO—S—CS—NH—C$_3$H$_7$

14. A method as set forth in claim 12, wherein said compound is the mixed anhydride of suberic acid and N-p-bromophenyl-dithiocarbamic acid having the formula Br—C$_6$H$_4$—NH—CS—S—CO—(CH$_2$)$_6$
—CO—S—CS—NH—C$_6$H$_4$Br 15. A method as set forth in claim 12, wherein said compound is the mixed anhydride of sebacic acid and of N-propyl-dithiocarbamic acid having the formula

C$_3$H$_7$—NH—CS—S—CO—(CH$_2$)$_8$
—CO—S—CS—NH—C$_3$H$_7$

16. A method as set forth in claim 12, wherein said compound is the mixed anhydride of sebacic acid and of N-isopropyl-dithiocarbamic acid having the formula

C$_3$H$_7$—NH—CS—S—CO—(CH$_2$)$_8$
—CO—S—CS—NH—C$_3$H$_7$

17. A method as set forth in claim 12, wherein said compound is the mixed anhydride of sebacic acid and of N-p-bromophenyl-dithiocarbamic acid having the formula BrC$_6$H$_4$—NH—CS—S—CO—(CH$_2$)$_8$
—CO—S—CS—NH—C$_6$H$_4$Br 18. A method as set forth in claim 12, wherein said compound is the mixed anhydride of acetic acid and N-p-bromophenyl-dithiocarbamic acid having the formula BrC$_6$H$_4$—NH—CS—S—CO—CH$_3$ 19. A method as set forth in claim 12, wherein said compound is the mixed anhydride of benzoic acid and N-p-chlorophenyl-dithiocarbamic acid having the formula ClC$_6$H$_4$—NH—CS—S—CO—C$_6$H$_5$ 20. A method as set forth in claim 12, wherein said compound is the mixed anhydride of ethylene-bis-dithiocarbamic acid and p-nitro-benzoic acid having the formula

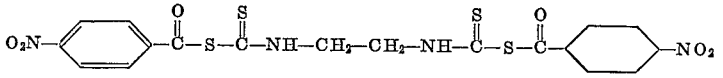

21. A method as set forth in claim 12, wherein said compound is the mixed anhydride of phenyl acetic acid and ethylene-bis-dithiocarbamic acid having the formula

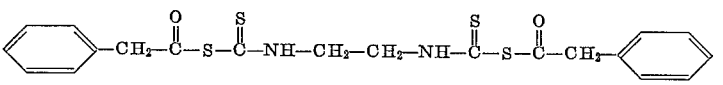

22. A method of killing nematodes which comprises applying to nematode infested soil a nematocidal amount of a compound of the formula R$_1$—NH—CS—S—CO—(CH$_2$)$_{2m}$
—CO—S—CS—NH—R$_2$ wherein R$_1$ and R$_2$ are members of the group consisting of lower alkyl and monohalophenyl, and $m$ is an integer between 2 and 4.

23. A method of killing nematodes which comprises applying to nematode infested soil a nematocidal amount of a compound of the formula

R$_3$—NH—CS—S—CO—R$_4$ wherein R$_3$ and R$_4$ are members of the group consisting of lower alkyl, phenyl, and monohalophenyl.

24. A method of killing nematodes which comprises applying to nematode infested soil a nematocidal amount of a compound of the formula $$R_5-CO-S-CS-NH-C_2H_4-NH-CS-S-CO-R_6$$

wherein $R_5$ and $R_6$ are members of the group consisting of phenyl-(lower) alkyl tnd nitrophenyl.

References Cited by the Examiner

UNITED STATES PATENTS

| | | | |
|---|---|---|---|
| 2,045,275 | 6/36 | Teaper | 260—545 XR |
| 2,727,067 | 12/55 | Craig et al. | 260—545 |
| 2,784,227 | 3/57 | Klopping | 260—545 |
| 2,882,140 | 4/59 | Searle | 260—545 |
| 2,905,586 | 9/59 | Harman | 167—22 |
| 2,963,510 | 12/60 | Scott et al. | 260—545 |
| 3,007,843 | 11/61 | Luckenbaugh | 167—13 |
| 3,049,470 | 8/62 | Pieroh et al. | 167—22 |
| 3,070,491 | 12/62 | Heusch et al. | 167—22 |
| 3,085,043 | 4/63 | Beaver et al. | 167—13 |
| 3,088,862 | 5/63 | Werres et al. | 167—22 |

JULIAN S. LEVITT, *Primary Examiner.*

CHARLES B. PARKER, *Examiner.*